United States Patent
Gaudefroy et al.

[11] Patent Number: 5,407,032
[45] Date of Patent: Apr. 18, 1995

[54] BRAKING SYSTEM FOR A RAIL VEHICLE USING MATERIALS BASED ON CARBON

[75] Inventors: Louis-Marc Gaudefroy, Le Vesinet; Alain Van Hemelryck, Bondy, both of France

[73] Assignee: GEC Alsthom Transport SA, Paris, France

[21] Appl. No.: 140,392

[22] Filed: Oct. 25, 1993

[30] Foreign Application Priority Data

Oct. 26, 1992 [FR] France ................. 92 12720

[51] Int. Cl.$^6$ ............................................. B61H 13/00
[52] U.S. Cl. ................. 188/58; 188/218 XL; 188/71.6
[58] Field of Search ............... 188/58, 59, 218, 218 A, 188/213, 181, 71.1, 71.4, 71.6, 72.5, 205, 73.31, 33, 153 R, 367–369; D12/180

[56] References Cited

U.S. PATENT DOCUMENTS

| | | | |
|---|---|---|---|
| 4,237,791 | 12/1980 | Jackson | 188/59 |
| 4,238,006 | 12/1980 | Jackson | 188/59 |
| 4,301,895 | 11/1981 | Harrison | 188/59 |
| 4,782,922 | 11/1988 | Pearson | 188/71.1 |
| 4,845,747 | 2/1989 | Moedinger | 188/218 A |
| 4,958,703 | 9/1990 | Op Den Camp | 188/205 R |
| 5,010,985 | 4/1991 | Russell | 188/58 |
| 5,102,203 | 4/1992 | Tierney | 188/181 T |
| 5,121,818 | 6/1992 | McComic | 188/71.6 |
| 5,190,124 | 3/1993 | Haneda | 188/218 A |

FOREIGN PATENT DOCUMENTS

| | | |
|---|---|---|
| 0170298 | 2/1986 | European Pat. Off. . |
| 0219938 | 4/1987 | European Pat. Off. . |
| 0236658 | 9/1987 | European Pat. Off. . |
| 0478943 | 4/1992 | European Pat. Off. . |
| 2140710 | 1/1973 | France . |

Primary Examiner—Robert J. Oberleitner
Assistant Examiner—Clifford T. Bartz
Attorney, Agent, or Firm—Sughrue, Mion, Zinn, Macpeak & Seas

[57] ABSTRACT

The invention relates to a braking system for a rail vehicle, the braking system having at least one braking assembly mounted on an axle of the vehicle, and a friction disk and pads, at least the friction disk being made of a composite material based on carbon, the friction disk being keyed to the axle, the pads being disposed on stators housed in elements flanking the disk. The flanking elements are supported by the vehicle or a bogie corresponding to the axle, and the stators for the pads are actuated by actuators, the flanking elements being supported by the vehicle or by the bogie via a hinge member allowing for track distortion and play. A return member connects the elements to the vehicle or to the bogie.

17 Claims, 10 Drawing Sheets

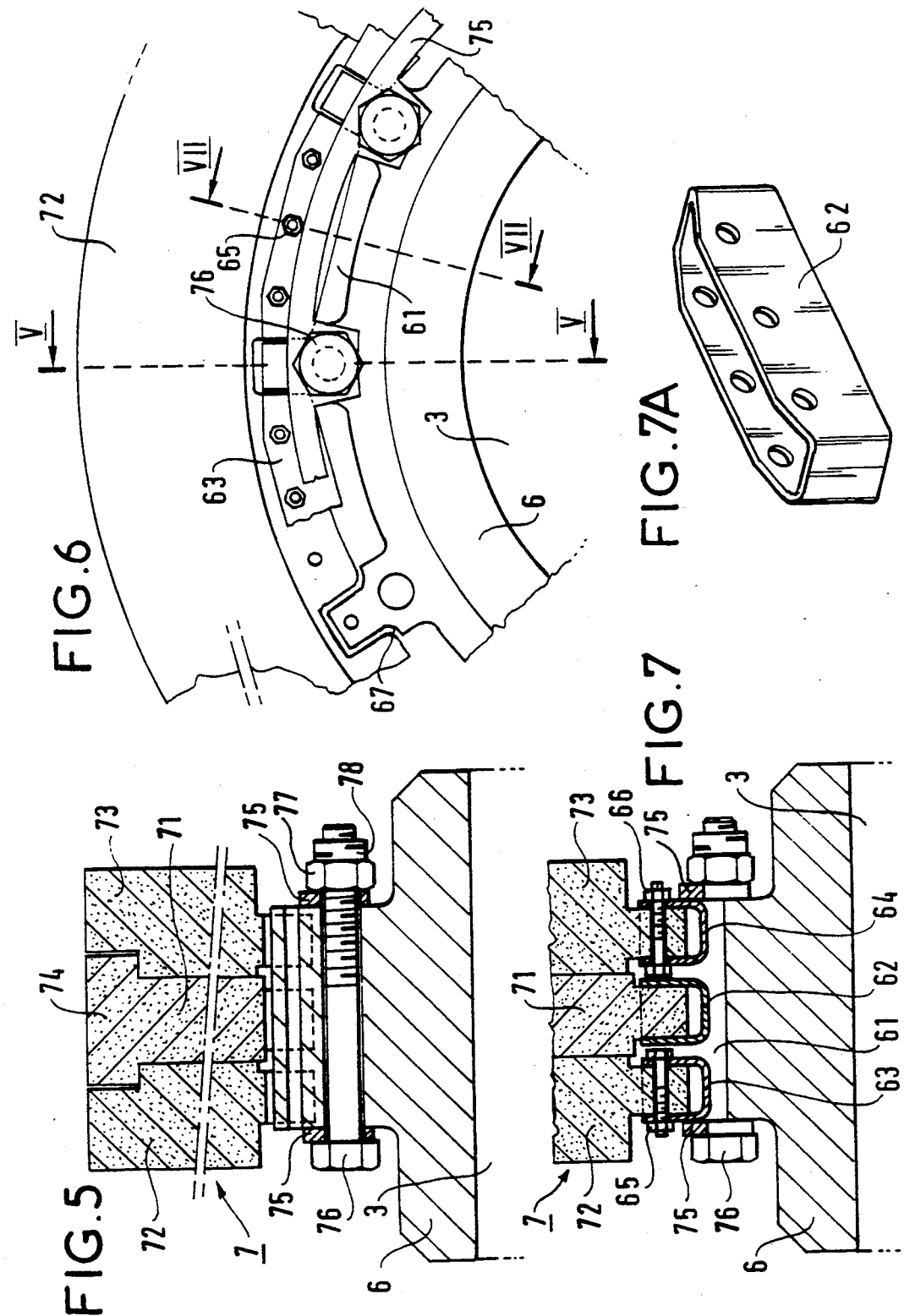

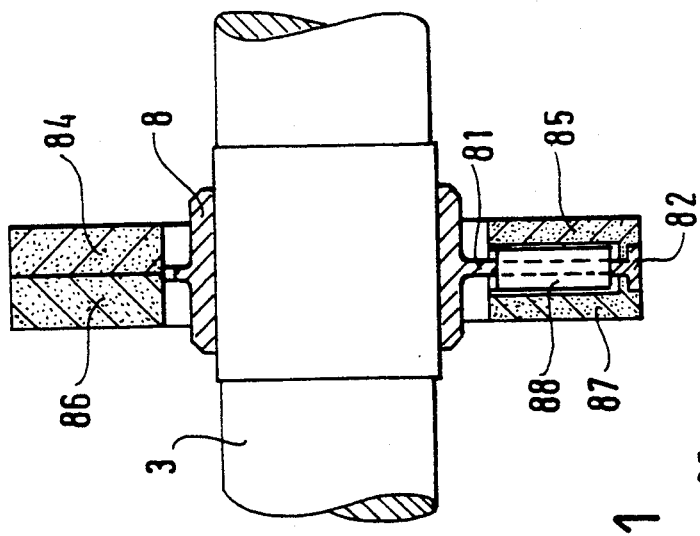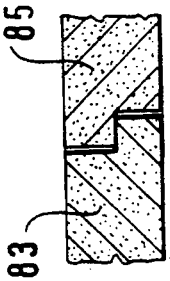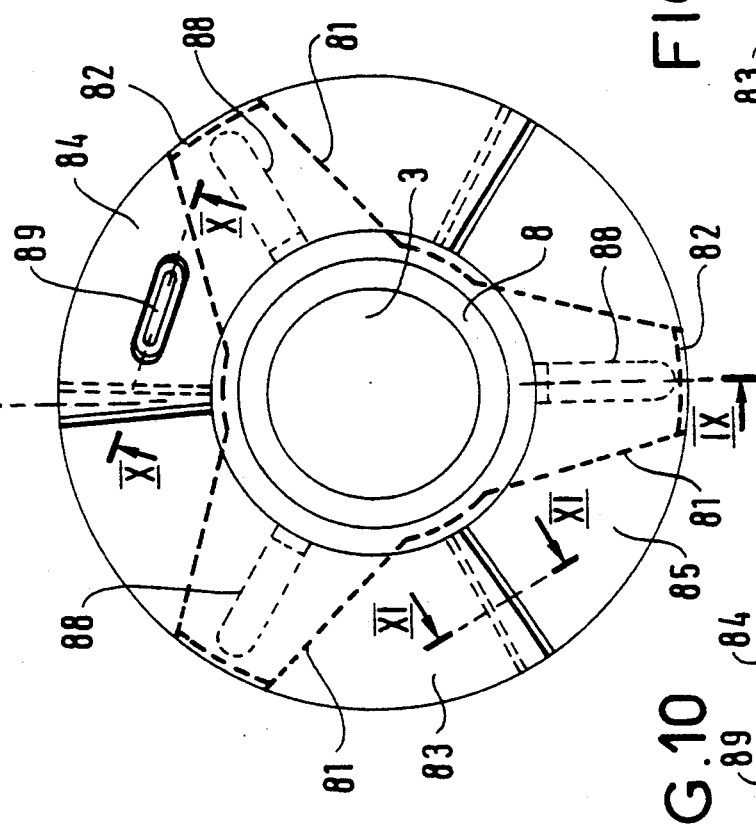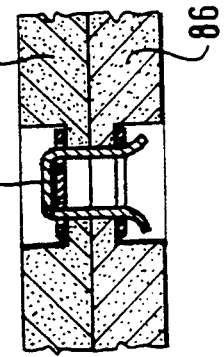

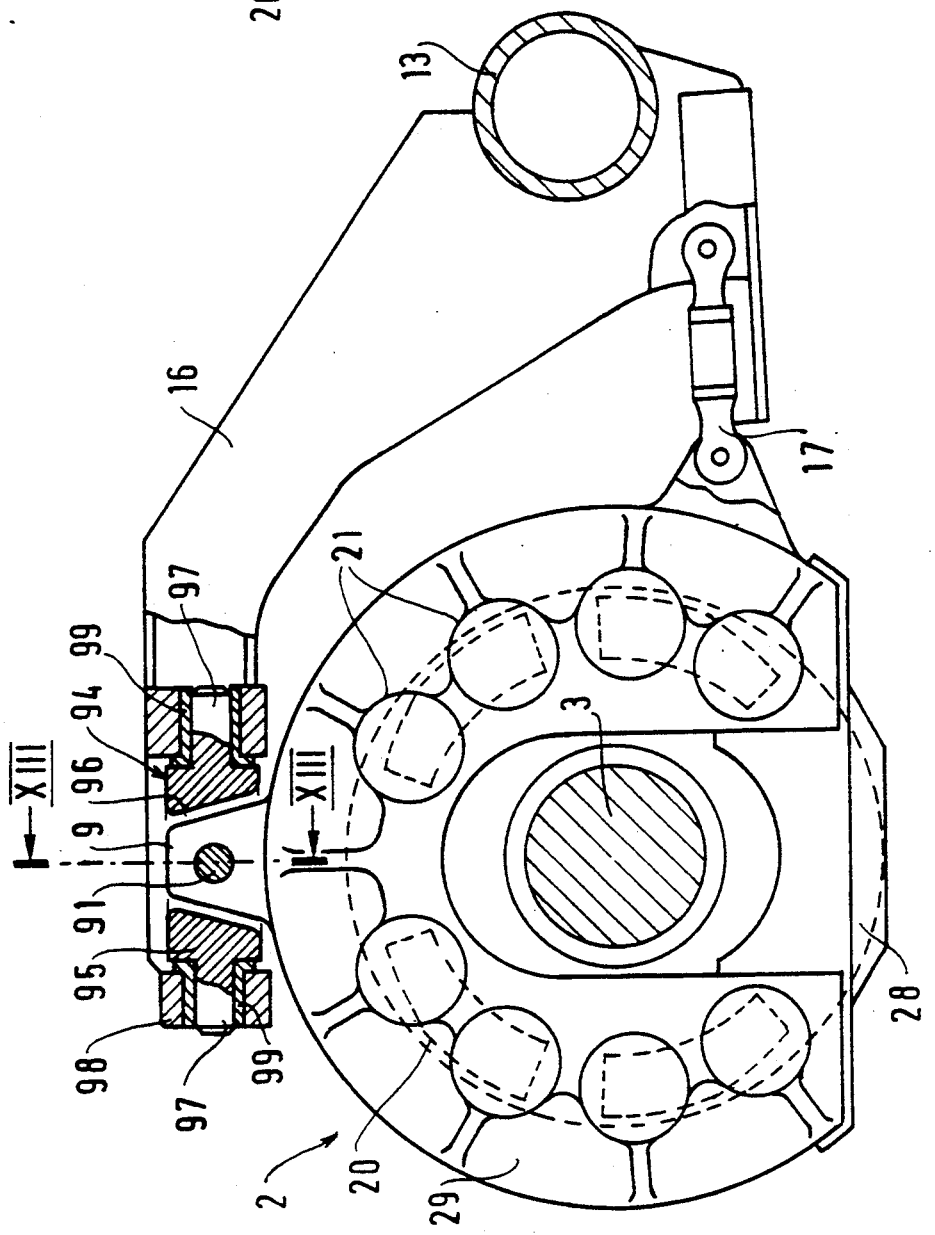
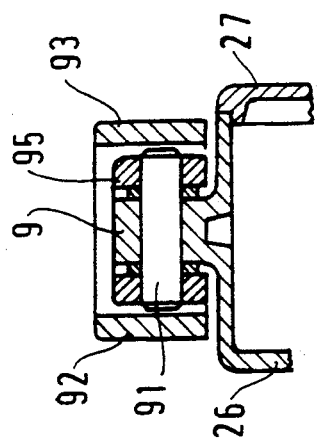
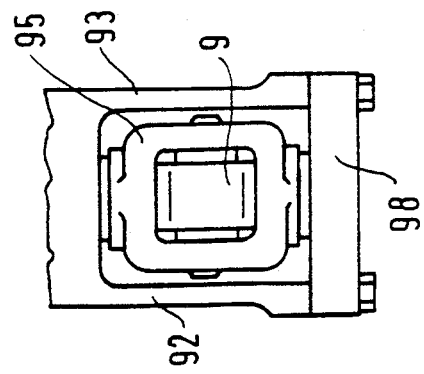

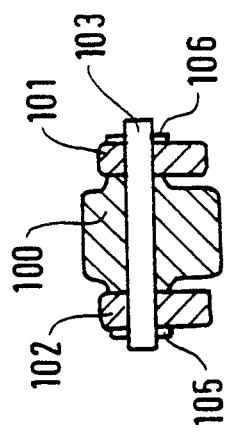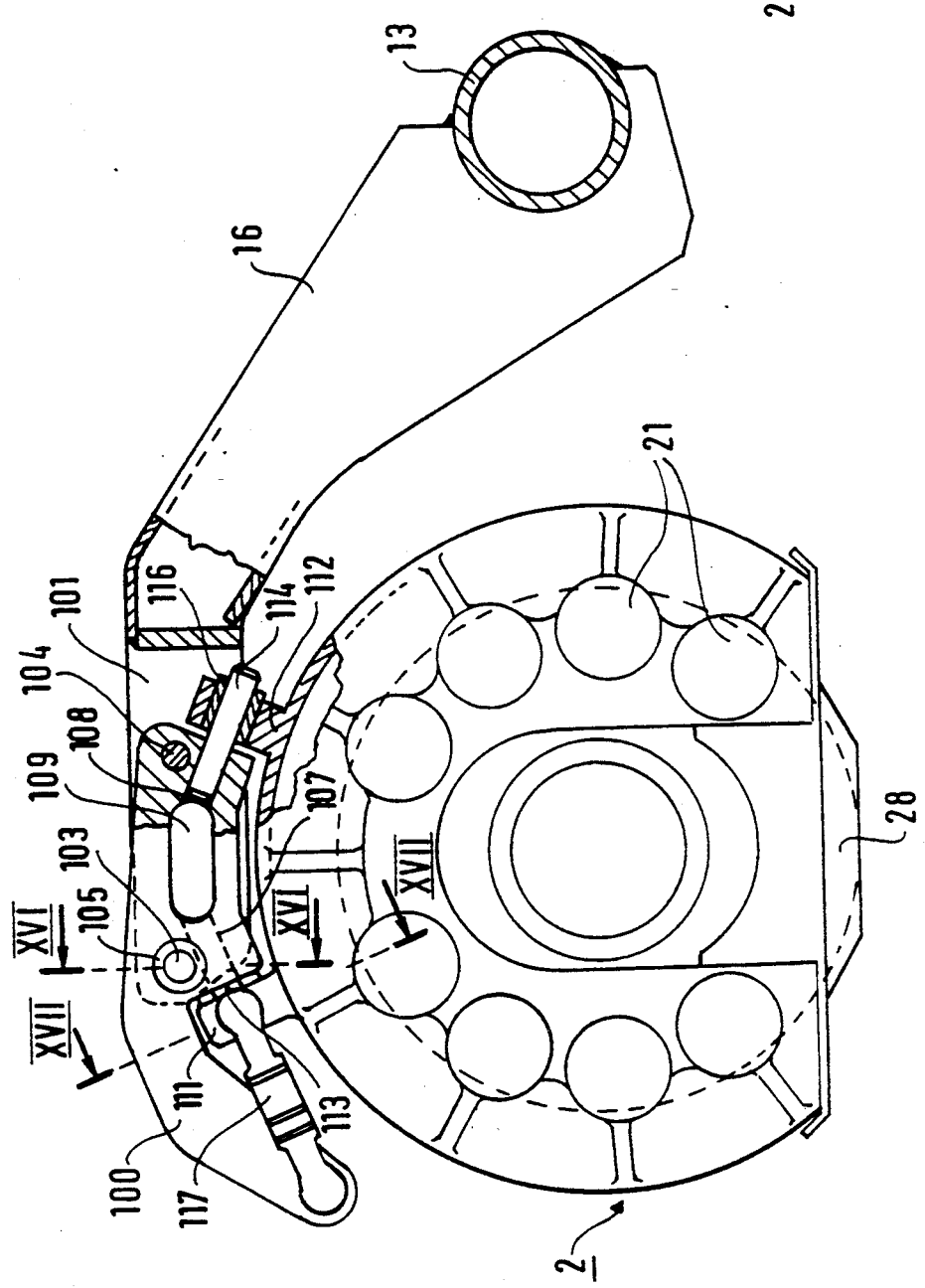

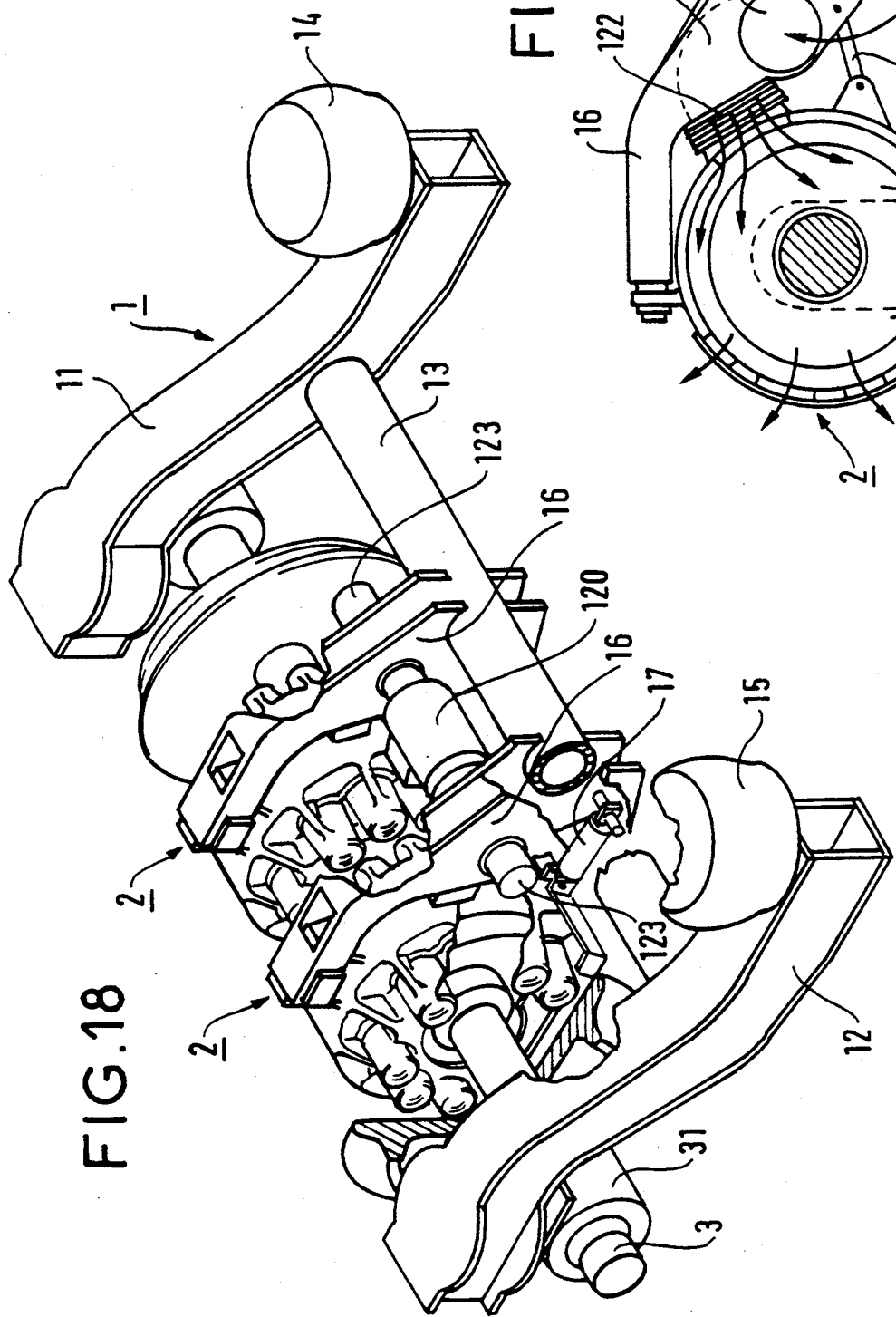
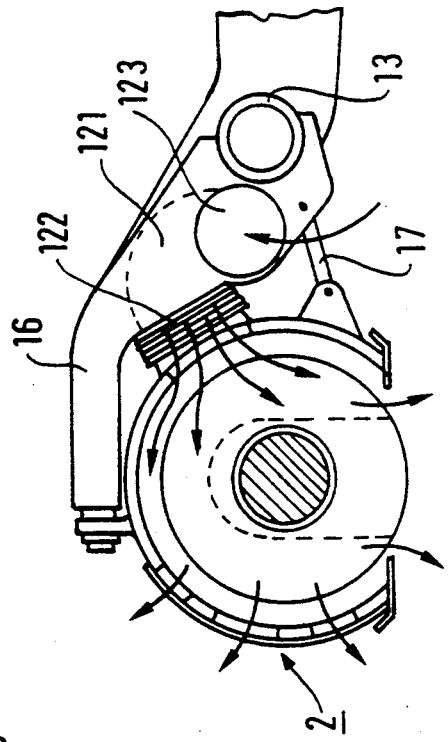
FIG.18
FIG.19

BRAKING SYSTEM FOR A RAIL VEHICLE USING MATERIALS BASED ON CARBON

The invention relates to a braking system for a rail vehicle using materials based on carbon for making brake pads and disks.

BACKGROUND OF THE INVENTION

A conventional rail vehicle braking system includes a pneumatic pipe referred to as the "main brake-pipe" which runs along the train. The compressed air pressure level in the pipe determines the reference level at which the brakes are applied (or released). For reasons of safety, when the main brake-pipe is at atmospheric pressure, the braking reference is at its maximum. Conversely, when the pressure is nominal in the main brake-pipe, no braking is required. The braking reference is therefore given by the pressure level in the main brake-pipe, and is transformed by a distributor into a pressure value (or a suction value) for controlling a flow-rate relay whose function is to fill (or to empty) the brake cylinders on the basis of the accumulated pressure in a compressed air store referred to as the auxiliary tank. Between the flow-rate relay and the brake cylinder, there is generally a solenoid valve referred to as an "anti-skid exhaust relay" which is controlled by an electronic circuit whose function is to control the slip of the axles, and to prevent locking by forcing the brake cylinders to empty into the atmosphere.

In general, the brake cylinders include slack adjusters to compensate for wear due to friction. In principle, the adjusters are integrated in the bogies and they actuate a mechanical linkage which amplifies the force with which the friction pads are applied against the energy-dissipating members constituted by the wheels and/or the disks. The pneumatic feed circuit for the brake cylinders on the bogie is connected to the circuit on the vehicle body via a hose pipe.

Depending on the complexity of the systems that are used conventionally, the relays may or may not have pressure amplifying ratios, and they may take into account external data so as to modulate the pressure in the brake cylinder as a function of said data.

Much research is currently being done on braking trains by means of disks and of pads made of material based on carbon. This type of braking is already used in aviation, and on Formula 1 cars. Its main advantage lies in its capacity to absorb very considerable amounts of energy. It is thought that this type of braking could be used advantageously in braking very high speed trains whose current braking systems are close to their limits. It would also make it possible to increase urban and suburban traffic densities (subway trains, suburban trains, and railcars, etc.). Furthermore, the light weight of this type of system would enable non-suspended masses to be reduced significantly.

However, adapting this braking system to rail vehicles is not easy, as demonstrated by the article written by Jacques Raison and entitled "Les matériaux de freinage" (Braking materials), published in the Revue Générale des Chemins de Fer, July–August 1991. Such carbon-based materials normally work at high temperatures (of about 1,000° C.) which, due to their closeness to the heat-sensitive surrounding portions and to heat conduction, give rise to high temperatures in said heat-sensitive surrounding portions (e.g. bearings). Another drawback results from the fact that the coefficient of friction of the materials varies as a function of speed, specific pressure, and humidity. This phenomenon is not a very considerable drawback in aviation or in Formula 1, since the aircraft pilot or the racing driver modulates the force he applies on the brakes as a function of what he feels. The same does not apply to rail vehicle braking, where the train driver does not directly feel the consequences of the braking force.

OBJECTS AND SUMMARY OF THE INVENTION

Using disks and pads that are made of carbon (or of a material based on carbon) in rail vehicle braking therefore requires those problems to be solved.

The braking system of the present invention comprises braking assemblies mounted on axles and organized specially so that the brake pads and disks can work at high temperatures without adversely affecting other elements, and so that braking can be effective and safe despite the dispersion in the coefficient of friction.

The invention therefore provides a braking system for a rail vehicle that may or may not be provided with bogies, said braking system comprising at least one braking assembly mounted on an axle of the vehicle, and a friction disk and pads. At least the friction disk is made of a composite material based on carbon, the friction disk being keyed to the axle, the pads being disposed on stators housed in elements flanking the disk. The flanking elements are supported by the vehicle or the bogie corresponding to the axle, and the stators for the pads are actuated by actuators, said flanking elements being supported by the vehicle or by said bogie via a hinge member allowing for track distortion and play. A return member connects said flanking elements to the vehicle or to said bogie.

The friction disk may be secured to the axle by fixing means that facilitate removing it. The advantage of this is that it is easy to replace worn disks.

The fixing means may comprise a hub keyed to the axle and receiving the friction disk which may be formed of one or more portions.

The braking system may include prevention means for preventing the heat energy generated in the friction disk on braking from propagating towards the axle.

The prevention means may comprise a thermal insulator interposed between the friction disk and the axle, or a layer of air therebetween.

The elements flanking the friction disk preferably form a protective casing. This protection from the environment can be supplemented by a perforated element that enables air to flow around the friction disk.

For greater effectiveness, it is preferable to dispose the actuators in a ring layout in the elements flanking the friction disk.

The actuators may be distributed in a plurality of groups that can be controlled separately.

The braking force may be taken up by a hinged link connecting the vehicle or the bogie to the braking assembly, or by a force sensor delivering a signal that represents the braking force.

With the braking system including a braking control circuit that is pneumatic, a transducer is provided that transforms the pneumatic pressure of the braking control circuit into hydraulic pressure so as to operate the actuators.

The hinge supporting the braking assembly may be disposed at the end of a suspension arm that is secured to the vehicle or to the bogie.

The braking system may include a ventilation member blowing into the braking assembly. The suspension arm may then serve as a ventilation duct between the ventilation member and the braking assembly.

BRIEF DESCRIPTION OF THE DRAWINGS

The invention will be better understood and other advantages and features will appear on reading the following description given by way of non-limiting example, and with reference to the accompanying drawings, in which:

FIGS. 5 to 7A show a second variant on the way in which a friction disk for a braking assembly of the invention is implemented and installed;

FIGS. 8 to 11 show a third variant on the way in which a friction disk for a braking assembly of the invention is implemented and installed;

FIGS. 12 to 14 show a first variant on the way in which the braking assembly of the invention is hinged on its suspension arm;

FIGS. 15 to 17 show a second variant on the way in which the braking assembly of the invention is hinged on its suspension arm;

FIGS. 18 and 19 show how braking assemblies of the invention are cooled by ventilation.

DETAILED DESCRIPTION OF THE PREFERRED EMBODIMENT

By way of example, the description relates to a braking assembly mounted on a bogie axle and supported by the bogie.

Figure 1:
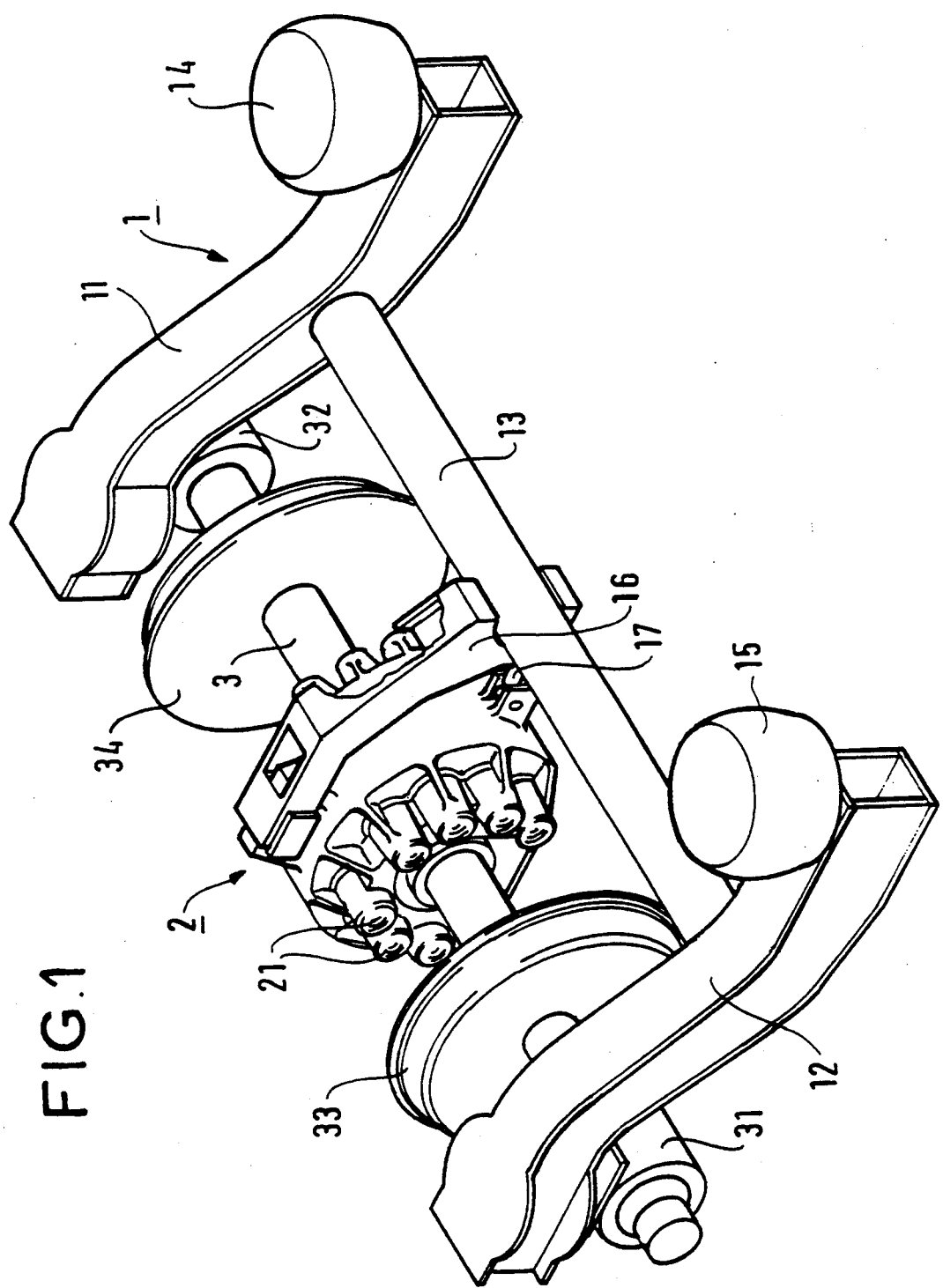
FIG. 1 shows the end of a rail vehicle bogie equipped with a braking assembly of the invention.

FIG. 1 shows the end of a bogie 1 equipped with a braking assembly 2. The bogie includes two longitudinal members 11 and 12 interconnected at the end that is shown via a crossbar 13. The longitudinal members support secondary suspension blocks 14 and 15 on which the rail vehicle rests. At this end of the bogie, the longitudinal members bear against the axle boxes 31 and 32 of the axle 3 via primary suspension blocks (not shown). The wheels 33 and 34 mounted on the axle 3 are also shown.

The braking assembly 2 is hinged at its top to allow for the usual track distortion and play encountered by rail vehicle axles. The braking assembly is suspended at the end of an arm 16 fixed to the crossbar 13. The braking assembly is designed to accommodate the vertical motion of the primary suspension between the frame of the bogie and the axles. The braking torque is taken up by a link 17 fixed at one end to the bogie and connected at the other end to the braking assembly via a ball.

FIG. 1 also shows the housings 21 for the actuators, which housings are disposed in a ring layout on either side of the braking assembly.

Figure 2:
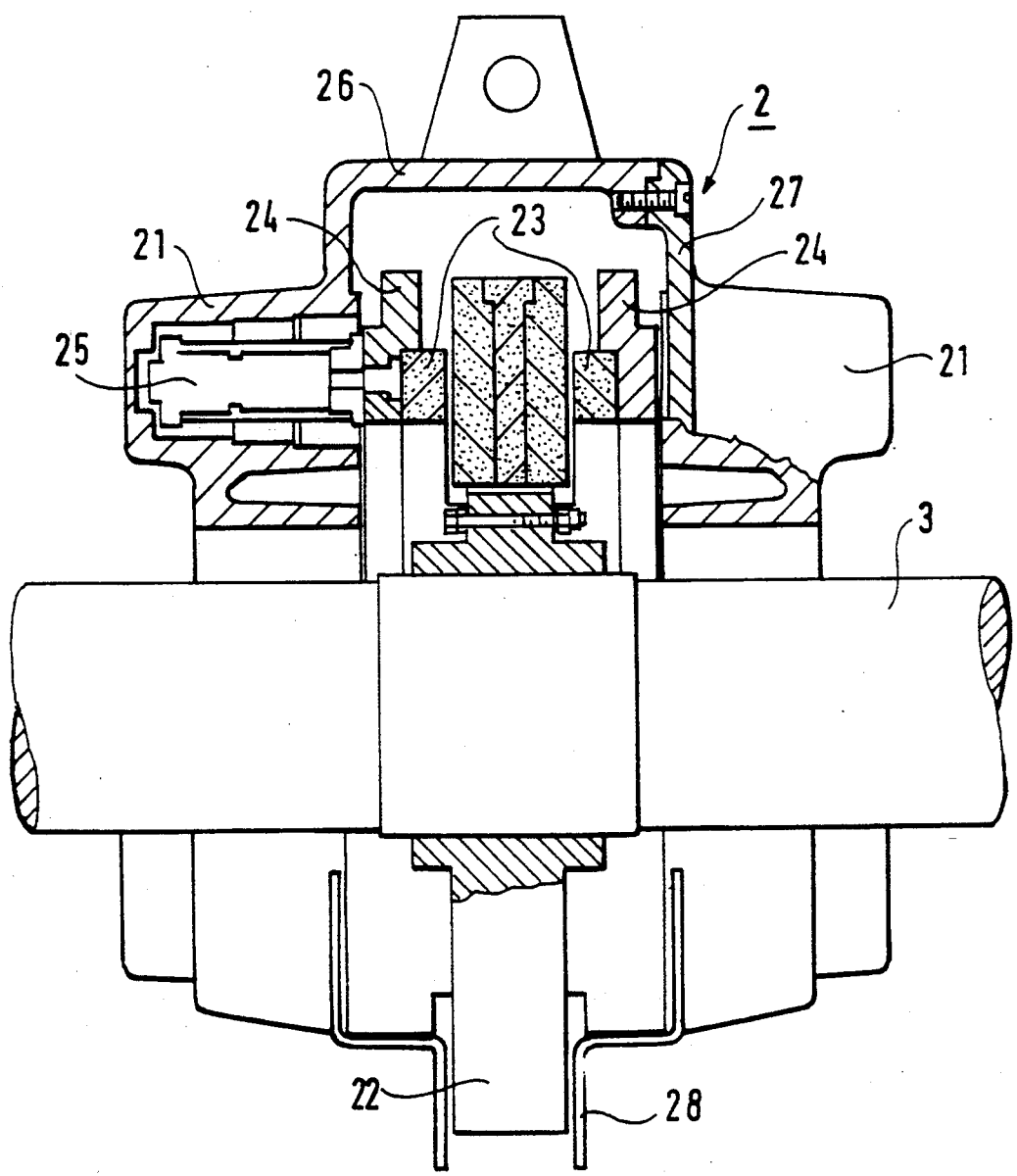
FIG. 2 is a view in section through such a braking assembly.

FIG. 2 shows the inside of the braking assembly 2 in vertical section. The dissipator member for dissipating the braking energy is constituted by a rotary friction disk 22 made of a composite material based on carbon, such as for example a carbon/carbon composite. The friction disk 22 is keyed to the axle 3. Braking is obtained by applying pads 23 against the disk 22, which pads may be made of the same material as that of the disk 22 or of a similar material. The pads 23 are mounted on stators 24 which are displaced by actuators 25 disposed in the housings 21. Advantageously, the actuators are hydraulic actuators disposed in a ring layout.

The casing of the braking assembly may be constituted by two portions 26 and 27 fixed together by screws in a plane that is transverse to the axle. A netting screen 28 fixed to the casing protects the bottom of the casing from the environment.

The rotary friction disk may be implemented and installed on the axle in different ways.

Figure 3:
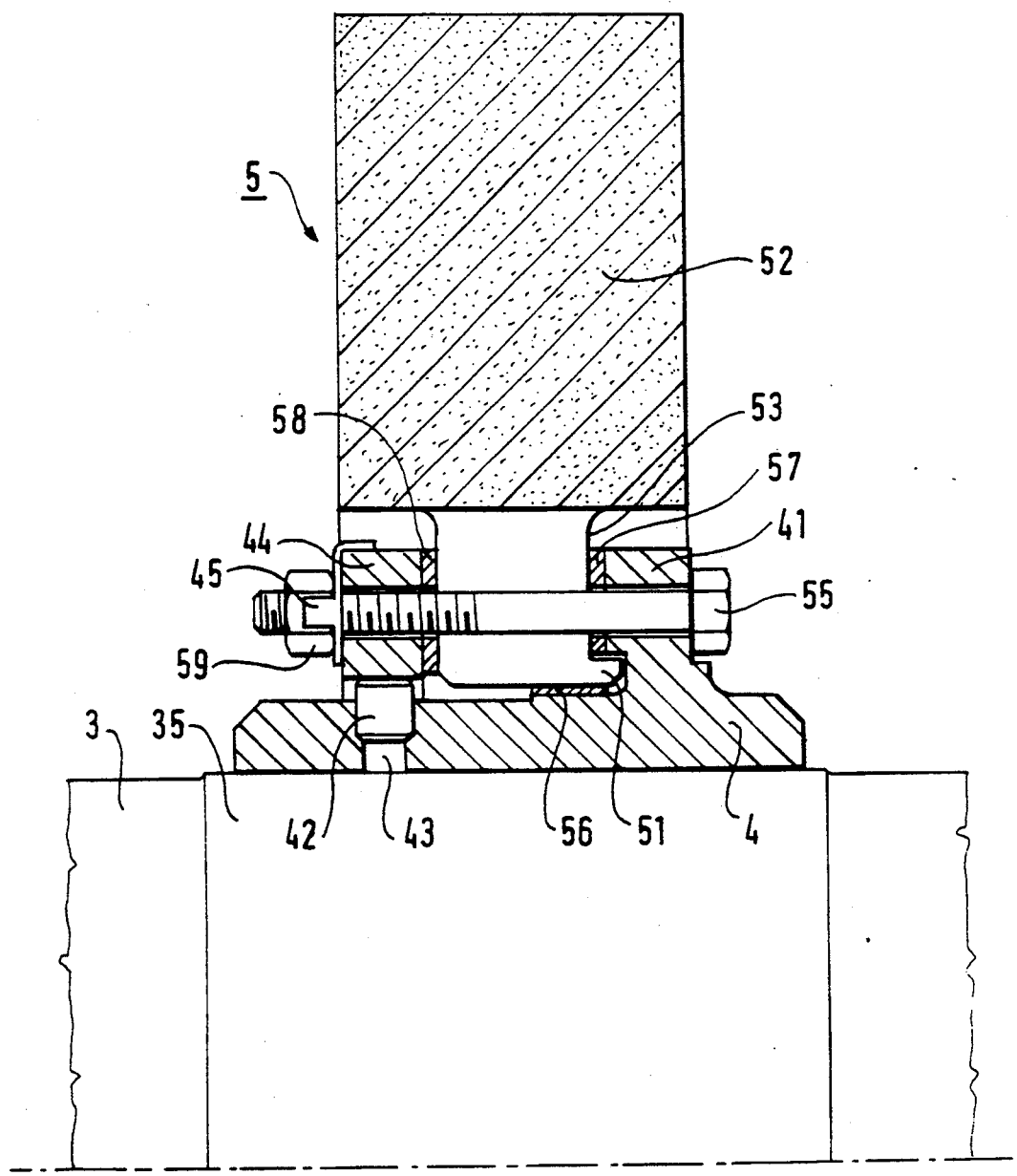
FIGS. 3 and 4 show a first variant on the way in which a friction disk for a braking assembly of the invention is implemented and installed.
Figure 4:
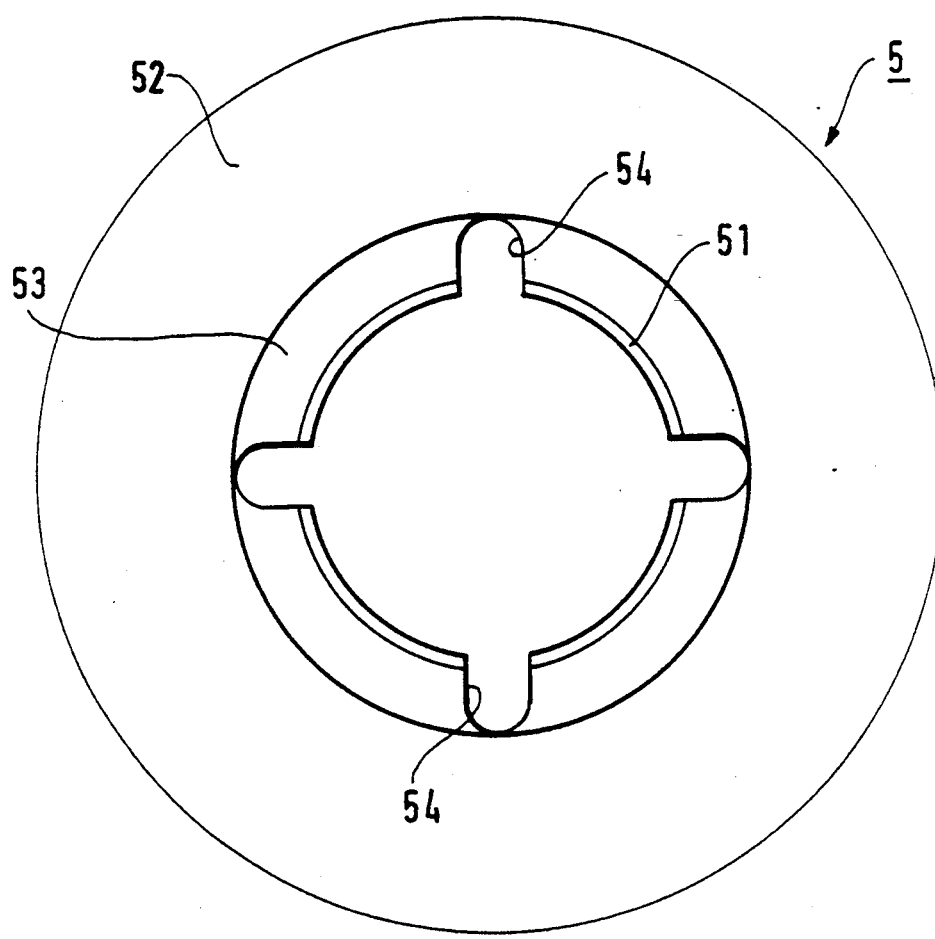

FIGS. 3 and 4 show a first variant on the way in which a friction disk of the invention is implemented and installed. A hub 4 is shrink-fitted on the central portion 35 of the axle 3. A disk 5 made of a friction material is attached to the hub by an assembly system using a lip 51. The disk 5 is in the form of an assembly including a peripheral disk unit 52 offering friction faces for braking. It also includes an inner annular portion 53 which is thinner than the disk unit 52 and which is provided with the lip 51. The annular portion 53 is provided with four recesses 54 disposed regularly around the periphery thereof. The recesses may be more numerous, and are designed to enable fixing screws 55 to be passed therethrough.

The disk 5 is mounted on the hub 4 as follows. Firstly, ring 56 is placed on the hub 4. Then washer 57 is installed against the axial abutment 41 of the hub 4. The washer may be held in position by the presence of screws 55 passing through the abutment 41. The disk 5 is slid along the axis of the axle until the lip 51 engages under the abutment 41. Washer 58 is installed and it is also held in position by the screws 55. A centering peg 42 is then placed in a recess 43 provided in the hub 4, and ring 44 is then installed. This ring is constrained to rotate with the hub by the centering peg 42. All these elements are fixed by the screws 55, nuts 59 and lock washers 45.

There is a certain amount of radial clearance between ring 56 and the disk 5, and between the lip 51 and the abutment 41. These clearances enable the disk to be centered on the hub: when cold, on the inside diameter of the disk, and when hot, after expansion, on the inside diameter of the abutment.

An appropriate choice of the material of ring 56 and of the washers 57 and 58 ensures good protection against heat flowing towards the hub 4 and the axle 3. Elements 56, 57, and 58 are advantageously made of stainless steel.

The first variant offers the advantage of having a friction-material disk that is not directly secured to the axle. In this way, the vibrations of the disk caused by the wheels running along the tracks are damped by the disk rubbing both on the hub and on ring 44.

FIGS. 5 to 7A show a second variant on the way in which a friction disk of the invention is implemented and installed. A hub 6 is shrink-fitted on the axle 3. The hub has grooves 61 regularly distributed around its periphery and parallel to the axis of the axle. The grooves enable the friction disk 7 to be driven in rotation. The disk 7 is made up of three associated disk units: a central disk unit or wedge 71 disposed between two side disk units 72 and 73 made of a friction material. The wedge 71 may also be made of the same material. The three disk units have internal grooves. The side disk units are protected against the effects of the centrifugal force by a shoulder 74 on the wedge, and by the complementary shapes of the side disk units. The disk units 71, 72, and 73 are held transversely by stopping sectors 75 fixed to the hub 6 by bolts 76, nuts 77 and lock washers 78 disposed regularly around the hub.

The disk 7 is mounted on the hub 6 as follows. The wedge 71 is placed in position on the axle 6, with the grooves in the wedge 71 and in the axle being provided such that one part fits into the other. Before placing the wedge on the axle, each of the teeth between the grooves in the wedge is provided with a collar 62 (see FIG. 7A) fixed to the tooth by sets of nuts and bolts. On either side of the wedge 71, the disk units 72 and 73 that are to constitute the friction sectors are then installed. The disk units 72 and 73 are installed in the same way as the wedge 71, and they are previously provided with collars 63 and 64 that are identical to the collar shown in FIG. 7A. FIG. 7 clearly shows the sets 65 and 66 of nuts and bolts that retain collars 63 and 64 on disk units 72 and 73. The sets of nuts and bolts retaining collars 62 are disposed in alternate manner so as not to hinder sets 65 and 66.

The collars 62, 63 and 64 prevent the material making up the disk units from being bruised. The collars are also designed to form a thermal barrier for protecting the hub and the axle. Preferably, the collars are made of stainless steel. Better thermal insulation is provided by disposing the collars on intermediate ledges 67 instead of directly on the bottoms of the grooves (see FIG. 6).

Finally, the stopping sectors 75 are mounted and secured to the axle by being bolted.

This variant offers the advantage of making it easy to remove the friction material without having to release the hub from the axle.

FIGS. 8 to 11 show a third variant on the way in which a friction disk of the invention is implemented and installed. A hub 8 is shrink-fitted on the axle 3. The hub is provided with three arms 81 spaced 120° apart from one another. Each arm has a shoulder 82 at its end, which shoulder serves as a retaining element for retaining the friction material. The arms are thin compared with their width as shown in FIGS. 8 and 9.

The friction material is distributed in two groups of three sectors, each group being disposed on either side of the plane of the arms of the hub. FIG. 8 shows a group of three sectors 83, 84, and 85. FIG. 9 shows two other sectors 86 and 87. The sectors are rotated with the hub via keys 88 inserted in each arm. Facing sectors are held together by, for example, a system of staples. For reasons of clarity, only one staple 89 is shown buried in the thickness of sectors 84 and 86. FIG. 10 shows the disposition of such a staple. Other fixing means may be used instead of staples, e.g. a system of clips.

As shown in FIG. 11, adjacent sectors in the same group have offset complementary steps so that, when the sectors are brought together, transverse strength is provided by the pressure that is applied via the faces of the sectors.

The sectors are protected by shoulders 82 against being torn away by the centrifugal force, the shoulders being situated at the ends of the arms 81.

This variant on implementing the disk offers the advantage of making it easy to remove the friction materials without having to release the hub from the axle. The sectors are not in contact with the central portion of the hub, thereby reducing heat propagation towards the axle.

Installation is performed as follows. The hub is shrunk onto the axle. The keys are put in position. The various sectors are installed and they are stapled together.

FIG. 12 shows the way in which the braking assembly is hinged on the suspension arm 16. The casing protects the rotary disk from any ballast that might be thrown up, and makes it possible to enclose the volume lying between the rotor and the stator, which volume is heated considerably during braking, while still allowing cooling air to flow between the rotor and the stator.

FIG. 12 shows the housings 21 for the actuators. As explained below, it is particularly advantageous to use hydraulic actuators. Such actuators 25 (see FIG. 2) may take the form of conventional hydraulic cylinders which can be adjusted to take up slack caused by wear in the pads and in the rotary disk. The hydraulic circuit interconnects all the cylinders, or every other cylinder, in which case either redundancy can be provided or extra force can be applied, as necessary.

The pads 23 are set back into supports or stators 24 connected to the pistons of the actuators (see FIG. 2). The shape and the number of the supports may be changed to suit specific needs. In FIG. 12, pads 20 have a shape that enables them to be continuously in register with the surface of the rotary disk regardless of the motion of the primary suspension of the bogie.

The braking assembly 2 has a suspension member 9 at its top, in which suspension member a pin 91 is engaged, the pin being retained by a hinge member 94 situated close to the arm 16. The hinge member is housed in the fork formed by the two teeth 92 and 93 terminating the arm 16 (see FIGS. 13 and 14). The hinge member comprises a rectangular body 95 provided with a vertical through hole 96 enabling the suspension member 9 to be housed, and with two horizontal through holes for receiving the pin 91. The hinge member 94 further comprises two stub axles 97 extending the body 95 forwards and backwards. One of the stub axles is housed in that portion of the arm 16 which interconnects the teeth 92 and 93. The other stub axle is housed in a closing part 98 for closing the fork. Rings 99 enable the stub axles 97 to rotate without friction.

The braking assembly 2 is thus free to roll on the two stub axles 97 so as to accommodate the distortions in the track that cause the axle to slope. In the transverse direction, the braking assembly is also free to pitch about the pin 91. The return link 17 may be replaced by a sensor that can give the image of the retaining force generated during braking.

FIGS. 15 to 17 show another variant on the way in which the braking assembly 2 is suspended. The suspension arm 16 is terminated by a fork having two teeth 101 and 102. The fork supports a hinge member 100 secured to the suspension arm 16 via two transverse axes 103 and 104 held stationary by locking elements such as those referenced 105 and 106. The hinge member 100 is provided with two sloping holes 107 and 108 opening out into a slot 109.

At its top, the braking assembly 2 has two suspension members 111 and 112, one on either side of the vertical. Each suspension member is provided with a hole in alignment respectively with hole 107 and with hole 108. The braking assembly is connected to the hinge member via two pins 113 and 114 mounted respectively in hole 107 and in hole 108 so as to be a tight fit therein. The pins pass through the holes in the suspension members 111 and 112. Resilient supports 115 and 116 of the shock mount type are placed in the holes of the suspension members and around the pins 113 and 114. The resilient supports compress to enable the braking assembly to be displaced slightly.

A force sensor 117 is disposed between the free end of the hinge member 100 and the suspension member 111. The force sensor provides an image of the twisting torque generated in the braking assembly during braking.

FIG. 18 shows a layout in which two braking assemblies of the invention are mounted on the same axle 3. To improve the removal of heat energy generated during braking, a motor-driven fan system 120 is mounted on the suspension arms 16 which serve as a volute.

The FIG. 19 shows the ventilation of a braking assembly. The volute is referenced 121. A bellows 122 extends the volute 121 and enables the air sucked in via filters 123 to be sent directly onto the periphery of the friction contacts and in contact with the pads.

Figure 20:
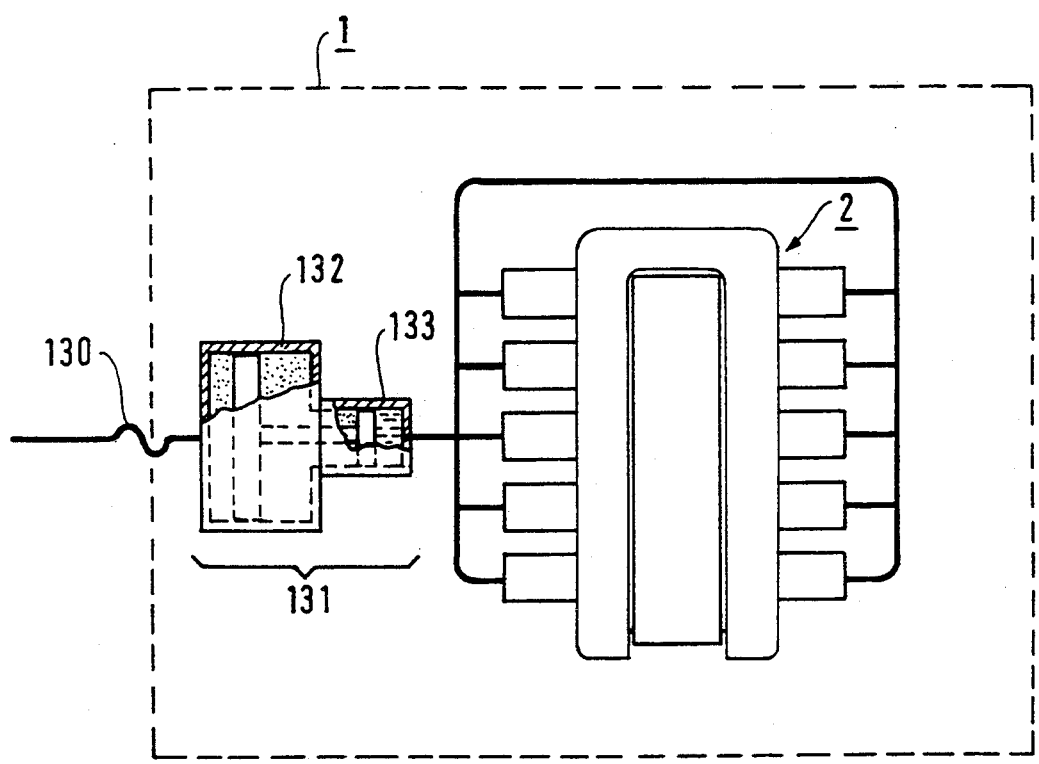
FIG. 20 is a diagram showing the braking circuit on a bogie.

It is particularly advantageous to use hydraulic pressure to operate the actuators. This is shown in FIG. 20. The pneumatic braking circuit, as described above, may remain unchanged up to a hose between the vehicle body and the bogie. The hose 130 is connected to a master cylinder 131. The pneumatic pressure in cylinder 132 is transformed into hydraulic pressure in cylinder 133. The hydraulic pressure is then distributed to the actuators of the braking assembly 2.

The pneumatic control of the braking system remains unchanged compared with tried and tested conventional systems, and the same anti-skid control logic can be used.

Data coming from the force sensors may be processed electrically on the brake control or pneumatically on the flow-rate relay. If the data is electrical at the sensor, it may be transformed by a transducer (the master cylinder 131) into pneumatic pressure for controlling the relay.

The changeover from pneumatic pressure to hydraulic pressure involves a considerable increase in the pressure with which the pads are applied against the rotary disk. Under pneumatic conditions, the pressure distributed to the actuators is approximately in the range 6 bars to 8 bars. The changeover to hydraulic conditions leads to pressure of about 150 bars being distributed to the actuators. In this way, the dispersion of the coefficient of friction of the material based on carbon is solved, said coefficient of friction varying widely as a function of climatic conditions and of temperature. By using high pressures, the coefficient of friction remains much more stable.

It is possible to use hydraulic pressure because of the fact that the braking assemblies are suspended from the frame of the bogie. This makes it possible to reduce the amplitude of the vibrations relative to the axle, and leaks at gaskets are thus avoided.

We claim:

1. A rail vehicle and a braking system therefor, said braking system comprising at least one braking assembly mounted on an axle of the vehicle, said at least one braking assembly comprising:
    a friction disk rotated by the axle;
    elements encasing and flanking said friction disk;
    stators housed in said elements;
    pads disposed on said stators;
    actuators for actuating the pads;
    a hinge member connecting said elements and one of the vehicle and a bogie of the vehicle so that said elements are free to move about at least a first axis transverse to a longitudinal axis of the axle for allowing for track distortion and play, and a second axis parallel to the longitudinal axis of the axle for allowing for movement of said elements relative to the vehicle in a direction transverse to the longitudinal axis under braking; and
    a return member connecting said elements and one of the vehicle and the bogie.

2. A braking system according to claim 1, further comprising fixing means for removably securing said friction disk to the axle.

3. A braking system according to claim 2, wherein said fixing means comprises a hub keyed to the axle and receiving the friction disk which is formed of one or more sections.

4. A braking system according to claim 1, further comprising prevention means for preventing heat energy generated in the friction disk on braking from propagating towards the axle.

5. A braking system according to claim 4, wherein said prevention means comprises a thermal insulator interposed between the friction disk and the axle.

6. A braking system according to claim 4, wherein said prevention means comprises a layer of air between the friction disk and the axle.

7. A braking system according to claim 1, further comprising a ventilation member blowing into the braking assembly.

8. A braking system according to claim 1, wherein said at least one braking assembly further comprises a perforated element providing protection from the environment.

9. A braking system according to claim 1, wherein said actuators are disposed in a ring layout in said elements flanking said friction disk.

10. A braking system according to claim 1, wherein said actuators are distributed in a plurality of separately controlled groups.

11. A braking system according to claim 1, further comprising a suspension arm secured at a proximal end thereof to one of the vehicle and the bogie and at a distal end thereof to said hinge member.

12. A braking system according to claim 1, further comprising a force sensor connecting one of the vehicle and the bogie to said at least one braking assembly and delivering a signal that represents a braking force.

13. A braking system according to claim 1, further comprising a pneumatic braking control circuit and a transducer for transforming pneumatic pressure in said braking control circuit into hydraulic pressure to operate said actuators.

14. A braking system according to claim 11, further comprising a ventilation member blowing into the braking assembly, and wherein said suspension arm comprises a ventilation duct between said ventilation member and the braking assembly.

15. A rail vehicle and a braking system therefor, said braking system comprising at least one braking assembly mounted on an axle of the vehicle, said at least one braking assembly comprising:
    a friction disk rotated by the axle;
    elements flanking said friction disk;
    an arm fixedly secured at a proximal end thereof to one of the vehicle and a bogie of the vehicle;
    stators housed in said elements;
    pads disposed on said stators;
    actuators for actuating the pads;

a hinge member connecting said elements and a distal end of said arm so that said elements are free to move about at least a first axis transverse to a longitudinal axis of the axle for allowing for track distortion and play, and a second axis parallel to the longitudinal axis of the axle for allowing for movement of said elements relative to the vehicle in a direction transverse to the longitudinal axis under braking;

a return member connecting said elements and one of the vehicle and the bogie; and a ventilation member blowing into said at least one braking assembly, wherein said arm comprises a ventilation duct between said ventilation member and said at least one braking assembly.

16. A braking system according to claim 15, wherein said elements encase said friction disk.

17. A braking system according to claim 15, wherein said friction disk is formed of a composite material comprising carbon.

* * * * *